US009445283B2

United States Patent
Ma et al.

(10) Patent No.: US 9,445,283 B2
(45) Date of Patent: Sep. 13, 2016

(54) CHANNEL SOUNDING FOR FREQUENCY DIVISION DUPLEX SYSTEM

(71) Applicant: Huawei Technologies Co., Ltd., Shenzhen (CN)

(72) Inventors: Jianglei Ma, Ottawa (CA); Ming Jia, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 220 days.

(21) Appl. No.: 13/974,819

(22) Filed: Aug. 23, 2013

(65) Prior Publication Data
US 2015/0055525 A1  Feb. 26, 2015

(51) Int. Cl.
H04W 24/02 (2009.01)
H04W 72/12 (2009.01)
H04L 1/00 (2006.01)

(52) U.S. Cl.
CPC ............... *H04W 24/02* (2013.01); *H04L 1/00* (2013.01); *H04W 72/1273* (2013.01); *H04W 72/1289* (2013.01)

(58) Field of Classification Search
None
See application file for complete search history.

(56) References Cited

U.S. PATENT DOCUMENTS

| 6,510,174 B1 | 1/2003 | Sexton et al. |
|---|---|---|
| 2007/0270154 A1 | 11/2007 | Kim et al. |
| 2010/0184444 A1 | 7/2010 | Suo et al. |
| 2011/0243262 A1 | 10/2011 | Ratasuk et al. |
| 2011/0268217 A1* | 11/2011 | Gormley ............... H04W 72/04 375/295 |
| 2012/0135773 A1* | 5/2012 | Shen et al. ................. 455/513 |
| 2012/0224556 A1* | 9/2012 | Yoon et al. ................. 370/329 |
| 2013/0044717 A1* | 2/2013 | Wang et al. ................ 370/329 |
| 2013/0053083 A1 | 2/2013 | Suh et al. |

FOREIGN PATENT DOCUMENTS

| CN | 101272593 A | 9/2008 |
|---|---|---|
| CN | 101345974 A | 1/2009 |
| CN | 101873698 A | 10/2010 |
| EP | 2077677 A1 | 7/2009 |
| EP | 2315482 A1 | 4/2011 |

(Continued)

OTHER PUBLICATIONS

International Search Report and Written Opinion of the International Searching Authority received in Patent Cooperation Treaty Application No. PCT/CN2014/084888 mailed Nov. 21, 2014, 12 pages.

*Primary Examiner* — Awet Haile
(74) *Attorney, Agent, or Firm* — Slater Matsil, LLP

(57) ABSTRACT

System and method embodiments are provided for channel sounding in a frequency division duplex (FDD) system. The embodiments enable a transmission point (TP) to determine channel information about a downlink channel from an uplink channel sounding signal received on the downlink channel frequency band during a time window reserved for uplink channel sounding on the downlink channel frequency band. In an embodiment, a method in a controller includes determining with the controller a schedule for an uplink sounding window in a downlink frequency band, wherein the uplink sounding window comprises a transmission window in at least a partial downlink frequency band that is reserved for uplink channel sounding, instructing a TP to signal the schedule to at least one wireless device in a coverage area of the TP, receiving a channel sounding signal in the downlink frequency band, and obtaining downlink channel state information from the channel sounding signal.

31 Claims, 6 Drawing Sheets

(56) References Cited

FOREIGN PATENT DOCUMENTS

| EP | 2566264 | A1 | 3/2013 |
| WO | 2008136609 | A1 | 11/2008 |
| WO | 2011099906 | A1 | 8/2011 |

\* cited by examiner

CHANNEL SOUNDING FOR FREQUENCY DIVISION DUPLEX SYSTEM

TECHNICAL FIELD

The present invention relates to a system and method for wireless communications, and, in particular embodiments, to a system and method for channel sounding for a frequency division duplex system.

BACKGROUND

New technologies such as coordinated multi-point (CoMP), interference alignment (IA), dirty paper coding (DPC), massive multiple-input multiple-output (MIMO), etc. may be some of the keys to capacity enhancement for wireless systems. However, all of the benefits provided by these technologies may not be realized due to the requirements for precise channel knowledge. For a frequency division duplex (FDD) system, various channel feedback schemes have been proposed. However, the overhead, accuracy, and feedback delay are still major roadblocks.

SUMMARY OF THE INVENTION

In accordance with an embodiment, a method in a controller for downlink channel sounding in a frequency division duplex (FDD) wireless system includes determining with the controller a schedule for an uplink sounding window in a downlink frequency band, wherein the uplink sounding window comprises a time window in a downlink frequency band that is reserved for uplink channel sounding; instructing a transmission point (TP) to signal the schedule to at least one wireless device in a coverage area of the TP; receiving a channel sounding signal in the downlink channel frequency band from the at least one wireless device; and obtaining downlink channel state information at the TP from the channel sounding signal.

In accordance with another embodiment, a network component configured for downlink channel sounding in a frequency division duplex (FDD) wireless system includes a processor and a computer readable storage medium storing programming for execution by the processor, the programming including instructions to: determine a schedule for an uplink sounding window in a downlink frequency band, wherein the uplink sounding window comprises a time window in a downlink frequency band that is reserved for uplink channel sounding; instruct a transmission point (TP) to signal the schedule to at least one wireless device in a coverage area of the TP; receive a channel sounding signal in the downlink frequency band from the at least one wireless device; and obtain downlink channel state information at the TP from the channel sounding signal.

In accordance with another embodiment, a method in a network component for determining downlink channel state information in a frequency division duplex wireless system includes determining with the network component a schedule for transmissions, wherein the schedule comprises a downlink (DL) transmission period for DL data transmission in a DL frequency carrier to wireless devices in a coverage area and an uplink (UL) sounding period for UL channel sounding in the DL frequency carrier; signaling the schedule to the wireless devices; transmitting DL data to at least one of the wireless devices during the DL transmission period; receiving UL sounding signals in the DL frequency carrier from at least one of the wireless devices during the UL sounding period; and determining DL channel state information according to the UL sounding signals.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
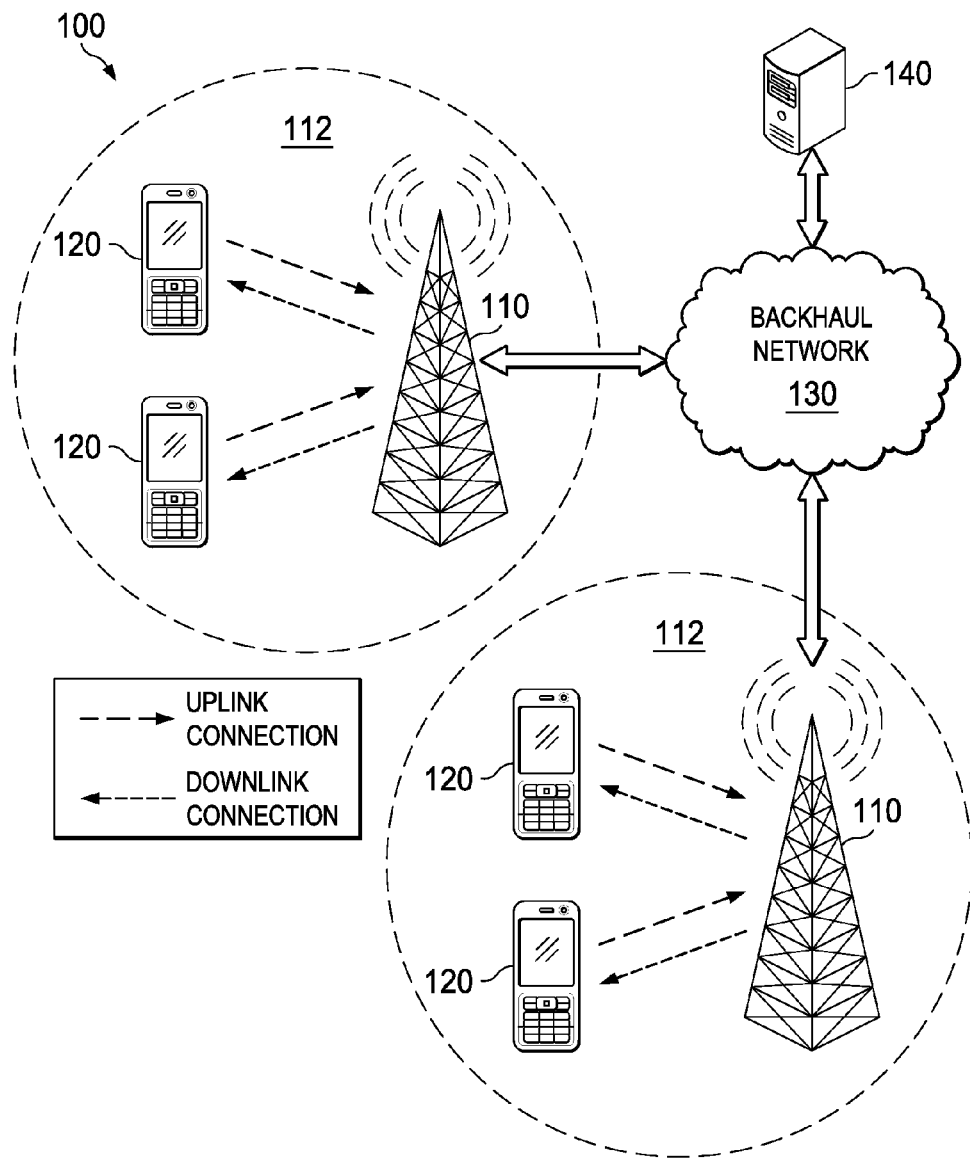
FIG. 1 illustrates a network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In FDD, downlink (DL) channel sounding is done through per antenna element based DL pilot measurement and report. Pilot overhead increases linearly with the number of transmit antennas $N_T$. Feedback overhead increases at a rate of $N_T N_R$ where $N_R$ is the number of receive antennas. For a large-scale (LS) multiple input, multiple output (MIMO) based system, both overheads become prohibitive for practical implementation. In addition, the transmitter cannot obtain full channel state information if the DL channel sounding is done with a low overhead channel state information (CSI) feedback scheme.

Uplink (UL) pilot based DL channel sounding is beneficial. It provides full CSI at the transmitter (CSIT) to the transmitter and allows better precoding, especially for multi-user (MU) MIMO. Furthermore, the pilot overhead does not increase with $N_T$. Therefore, in a LS-MIMO based system, since $N_T \gg N_R$, the pilot overhead for channel estimation is much smaller. However, in a FDD system, the DL and the UL signals are transmitted in different frequency bands. Thus, channel reciprocity no longer holds. Because of this and due to much narrower beam-widths in LS-MIMO, a more reliable way for obtaining accurate CSIT is needed.

Disclosed herein is a system and method for FDD DL channel sounding to provide complete CSIT to a transmission point (TP), an access point (AP), or a base transceiver station (BTS). In an embodiment, a UL sounding window is provided and reserved in the DL carrier. The location and the duration of the UL sounding window is dynamically or semi-statically configurable by the BTS, the TP, a central server, or a controller, and may depend, for example, on the number of DL active user equipment (UEs) (i.e., wireless devices) and the mobility of the UEs within the coverage area of the BTS. The controller may be the central server or may be the TP. In an embodiment, the controller is a master TP that also controls other TPs. In an embodiment, the location and the duration of the UL sounding window also depends on other factors such as the DL M-MIMO transmission mode to the UEs. The UE sends sounding signals during this period in the DL frequency band thereby providing the network with DL channel information by taking advantage of channel reciprocity.

In an embodiment, the uplink sounding window includes a transmission window in at least a partial DL frequency band that is reserved for UL channel sounding. Thus, only a portion of the DL frequency band is reserved for UL channel sounding.

In an embodiment, different sounding window configurations co-exist in neighboring coverage areas belonging to neighboring BTSs. Furthermore, since the number of UEs and the mobility of UEs within a coverage area for a given BTS may change dynamically, the sounding window configurations may change dynamically in each BTS. Neighboring BTSs may exchange information through a backhaul network in order to coordinate their UL sounding window schedules to mitigate any effects from interference caused by other UEs or BTSs transmitting at the same time on the same DL channel resources.

In another embodiment, a central server or controller provides each BTS with a UL sounding window schedule. The central server or controller receives information from each BTS regarding the number of UEs in the BTS's coverage area and the mobility of the UEs and uses the information to determine a UL sounding window for each BTS that mitigates interference between the UEs and the BTSs. The schedule may be quasi-static or may change dynamically as the conditions warrant.

When there is an overlap of DL transmission period and UL sounding windows between adjacent or neighboring UEs, interference may occur or be experienced by a UE receiving a DL signal while a neighbor UE is sending a sounding signal. In various embodiments, interference management schemes are utilized to mitigate or reduce the effect of the interference on the UE receiving the DL signal. In an embodiment, the AP transmitting the DL signal to the UE utilizes beamforming to enhance the DL signal strength such that the DL signal strength is much greater than the strength of the sounding signal. In another embodiment, the UE includes multiple receiver antennas that may be used to reject the interference from the sounding signal. Techniques for using multiple receiver antennas to reject interference are well known to those of ordinary skill in the art. In yet another embodiment, the scheduling of UL sounding windows for UEs that are near each other, but that are communicating with different APs are determined such that DL transmission (i.e., a DL signal) to a UE is avoided during a time or frequency band when/where a nearby or neighboring UE is transmitting a sounding signal.

In an embodiment, sounding window configuration information is sent to the UEs by the TP through broadcast signaling or multicast signaling. The sounding window configuration information may be sent semi-statically or dynamically.

In an embodiment, in order to control the DL-UL interference cause by the asynchronous sounding window settings, the sounding window configuration information is shared by neighboring transmitters. As used herein, in an embodiment, the term neighboring AP or neighbor AP refers to any AP that is adjacent to or near enough to another AP such that transmissions targeting to a first AP may cause interference in UEs associated with the other AP or with the other AP, or another AP that is associated with a UE that is near enough to a UE associated with the first AP such that transmissions by one UE associated with one AP may cause interference in the UE associated with the other AP. An AP may have more than one neighbor AP. As used herein, a UE is considered a neighbor of another UE if the two UEs are close enough that transmission in one may cause interference in the other. In an embodiment, the sounding window information exchange between APs is performed in a distributed manner where information may be exchanged between transmitters through a backhaul network. In another embodiment, the sounding window information exchange between APs is performed in a centralized manner in which each transmitter (e.g., AP) reports the sounding window configuration information to a central server and the central server sends the neighbor's configuration information to the other transmitters.

In an embodiment, because of channel reciprocity, the BTS uses the UL pilot signal transmitted by the UEs in the DL carrier to obtain complete CSIT information in the DL channel.

FIG. 1 illustrates a network 100 for communicating data. The network 100 comprises a plurality of TPs 110 each having a coverage area 112, a plurality of user equipment (UEs) 120, a backhaul network 130, and a central server 140. In some embodiment, the coverage areas 112 may overlap. As used herein, the term TP may also be referred to as an AP a BTS and the three terms may be used interchangeably throughout this disclosure. The TP 110 may comprise any component capable of providing wireless access by, inter alia, establishing uplink (dashed line) and/or downlink (dotted line) connections with the UEs 120, such as a BTS, an enhanced base station (eNB), a femtocell, and other wirelessly enabled devices. The UEs 120 may comprise any component capable of establishing a wireless connection with the TP 110. Examples of UEs include smart phones, laptop computers, and tablet computers. The backhaul network 130 may be any component or collection of components that allow data to be exchanged between the TP 110 and a remote end (not shown) and with the central server 140. In some embodiments, the network 100 may comprise various other wireless devices, such as relays, femtocells, etc.

In an embodiment, the network 100 is an FDD network and the TPs 110 schedule a UL sounding window in the DL carrier for performing DL channel sounding. Each TP 110 schedules the UL sounding window for the UEs 120 in its coverage area 112. If the TPs 110 are neighbors and utilize the same frequency bands, then the TPs 110 may communicate with each other to jointly schedule UL sounding periods, UL sounding opportunities and/or DL transmission opportunities (or channel resources in the time domain and frequency domain) for UEs close to the boundary of the coverage area such that neither TP 110 nor their UEs 120 experience negative consequences from interference caused by multiple simultaneous transmissions on the same frequency band. However, typically, the interference is suffered by the UE which is receiving a DL signal due to the co-transmission of a sounding signal from a nearby UE while the effects on the TP 110 are minimal. The UL sounding window schedule is dynamically adjustable by each TP 110 to substantially optimize the use of resources. In an embodiment, the TP 110 dynamically adjusts the UL sounding period based on the number of UEs 120 in its coverage area 112 and/or on the mobility of the UEs in its coverage area 112 as well as the DL transmission mode and/or the DL traffic type of the UE 120.

In other embodiments, the central server 140 creates a schedule for UL sounding windows in the DL carrier for each TP 110. The central server 140 dynamically adjusts the UL sounding window schedule for each TP 110 based on changing conditions, such as, for example, the number of UEs 120 in the coverage area 112 and the mobility of the UEs 120 in the coverage area 112.

In an embodiment, the TP 110 employs beamforming to help the UEs 120 distinguish the signals from the TP 110 from interference generated by, for example, a UE 120 performing UL sounding in a DL frequency carrier for a neighbor TP 110.

In an embodiment, orthogonal sequences are allocated to cell edge UEs 120 if the cell edge UEs 120 sound at the same time. As further explanation, assume two cells: cell A and cell B. The UEs performing sounding in cell A using the same time-frequency resources will need to use orthogonal sequences. Further assume that UE-ab is a cell edge UE of cell B, which is close to cell A. Then UE-ab should use a sequence that is orthogonal to both the sequences used in both cell A and cell B. The sequences used by cell center UEs in cell B, however, do not need to be orthogonal with those used by cell center UEs in cell A.

Figure 2:
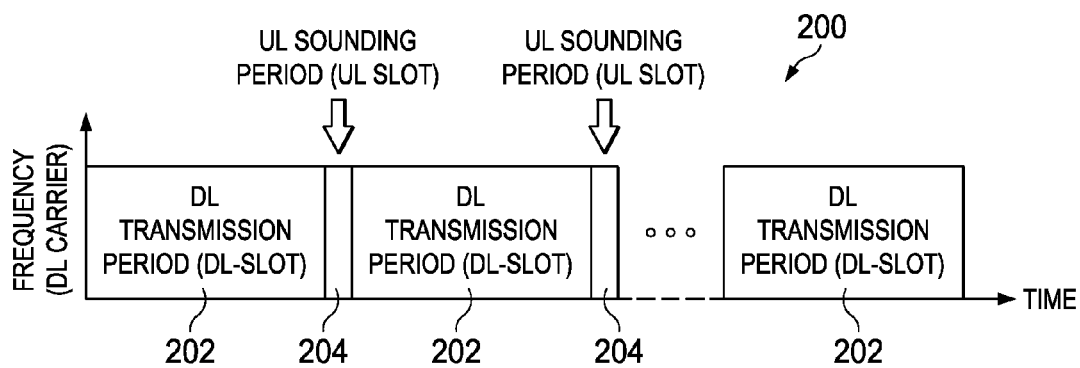
FIG. 2 is a graph illustrating an embodiment schedule for UL sounding and DL transmission.

FIG. 2 is a graph illustrating an embodiment schedule 200 for UL sounding and DL transmission. As shown, the schedule 200 includes a plurality of DL transmission periods (DL-slots) 202 separated by a UL sounding period (UL-slot) 204. In an embodiment, the UL-slots 204 are typically of a much shorter duration than the DL-slots 202.

Figure 3:
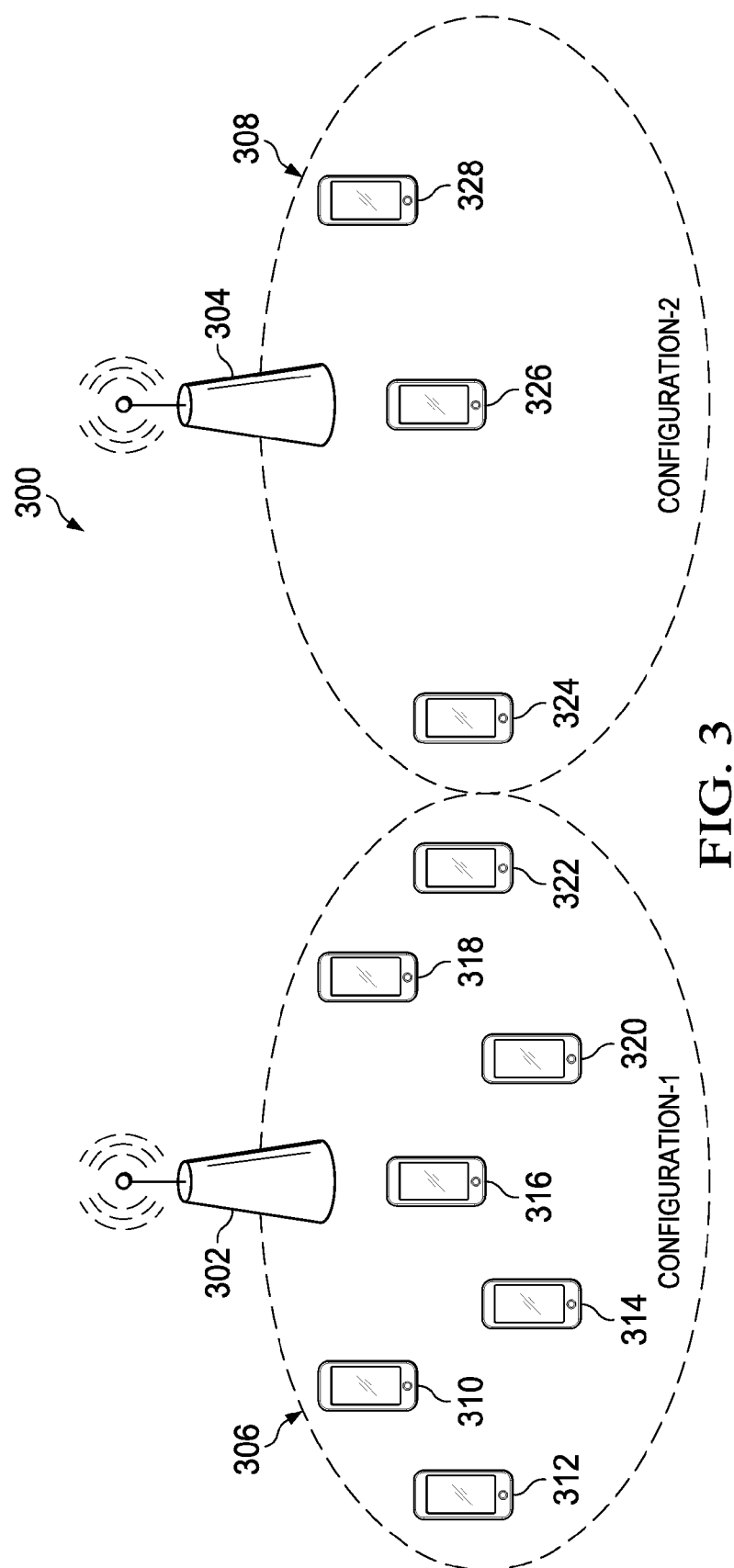
FIG. 3 is a diagram illustrating an embodiment communication system that provides for co-existence of different sounding window configurations for different APs.

FIG. 3 is a schematic diagram illustrating an embodiment communication system 300 that provides for co-existence of different sounding window configurations for different TPs. The system 300 includes multiple TPs 302, 304 and each TP 302, 304 has a corresponding coverage area 306, 308. The system 300 also includes a plurality of UEs 310, 312, 314, 316, 318, 320, 322, 324, 326, and 328. UEs 310, 312, 314, 316, 318, 320, 322 communicate with TP 302 and UEs 324, 326, 328 communicate with TP 304. Each TP 302, 304 may include more than one transmit node (i.e., virtual transmit nodes). Each TP 302, 304 determines its own UL sounding period schedule according to the number of UEs 310, 312, 314, 316, 318, 320, 322, 324, 326, 328 within its corresponding coverage area 306, 308 as well as other factors, such as mobility of the UEs and the amount of data to be transmitted to the UEs 310, 312, 314, 316, 318, 320, 322, 324, 326, 328 within its corresponding coverage area 306, 308. The schedules for each TP 302, 304 do not have to be the same and, in many embodiments, may be different.

Figure 4:
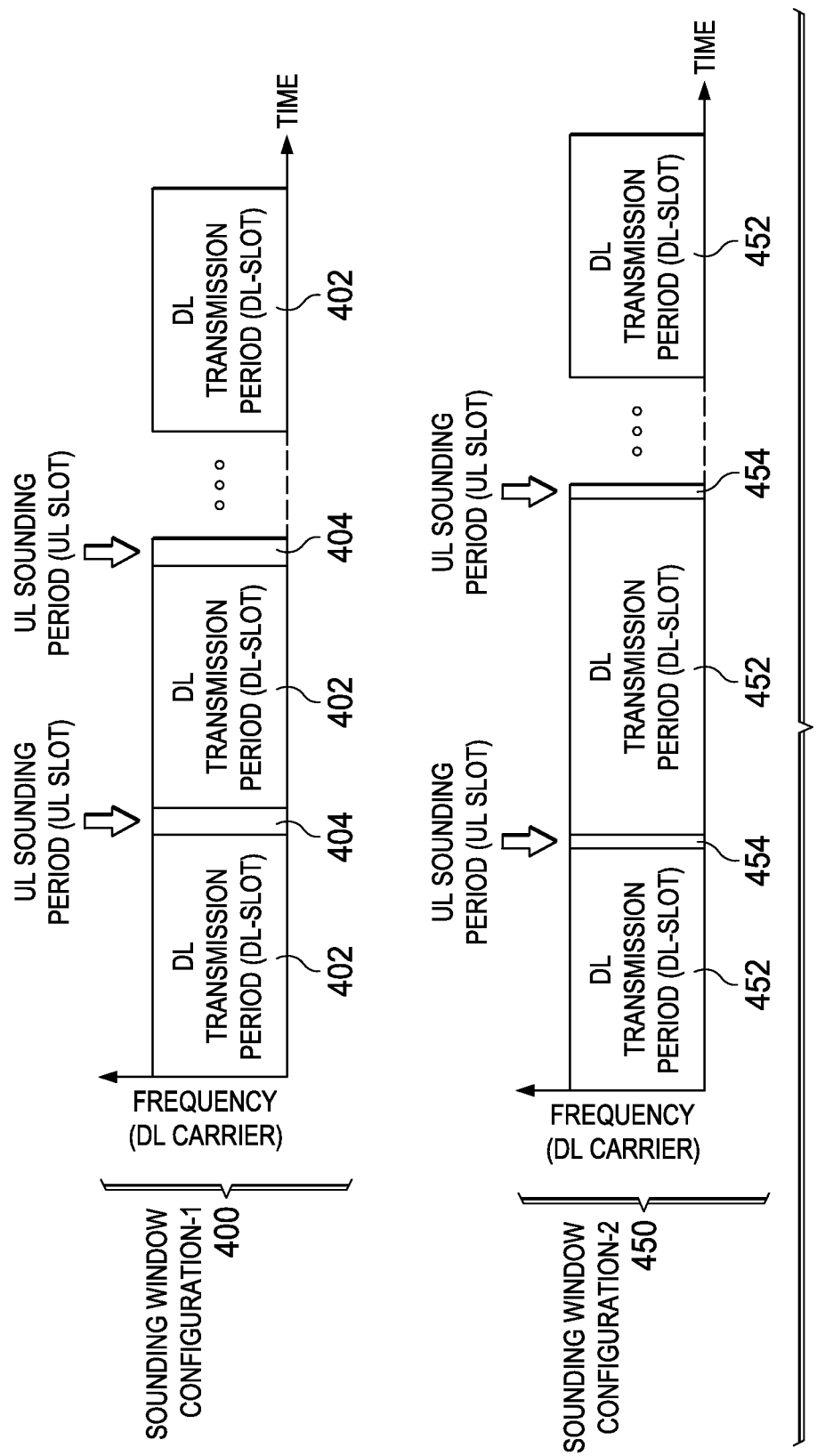
FIG. 4 is a graph of embodiment sounding window schedules for the APs depicted in FIG. 3.

FIG. 4 shows the embodiment sounding window schedules 400, 450 for the TPs 302, 304 depicted in FIG. 3. Schedule 400 corresponds to TP 302 and schedule 450 corresponds to TP 304. Schedule 400 includes a plurality of DL transmission periods 402 separated by UL sounding periods 404. Schedule 450 also includes a plurality of DL transmission periods 452 separated by UL sounding periods 454. As shown, the length of time allocated to the UL sounding periods 404 in schedule 400 is longer than the length of time allocated to the UL sounding periods 454 in schedule 450. It should also be noted that the length of time devoted to a DL transmission period 452 may vary over time such that different DL transmission periods 452 have different time lengths, as shown. Additionally, the time length (i.e., time duration) for the UL sounding periods 454 may vary over time as shown. Thus, the TP 302, 304 may adjust or change the time periods devoted to the DL transmission period and the UL sounding period depending on the conditions in the network, the number of UEs in the coverage area, the amount of data to be transmitted, as well as other factors. Therefore, two consecutive UL sounding windows (separated by a DL transmission period) may be different.

Figure 5:
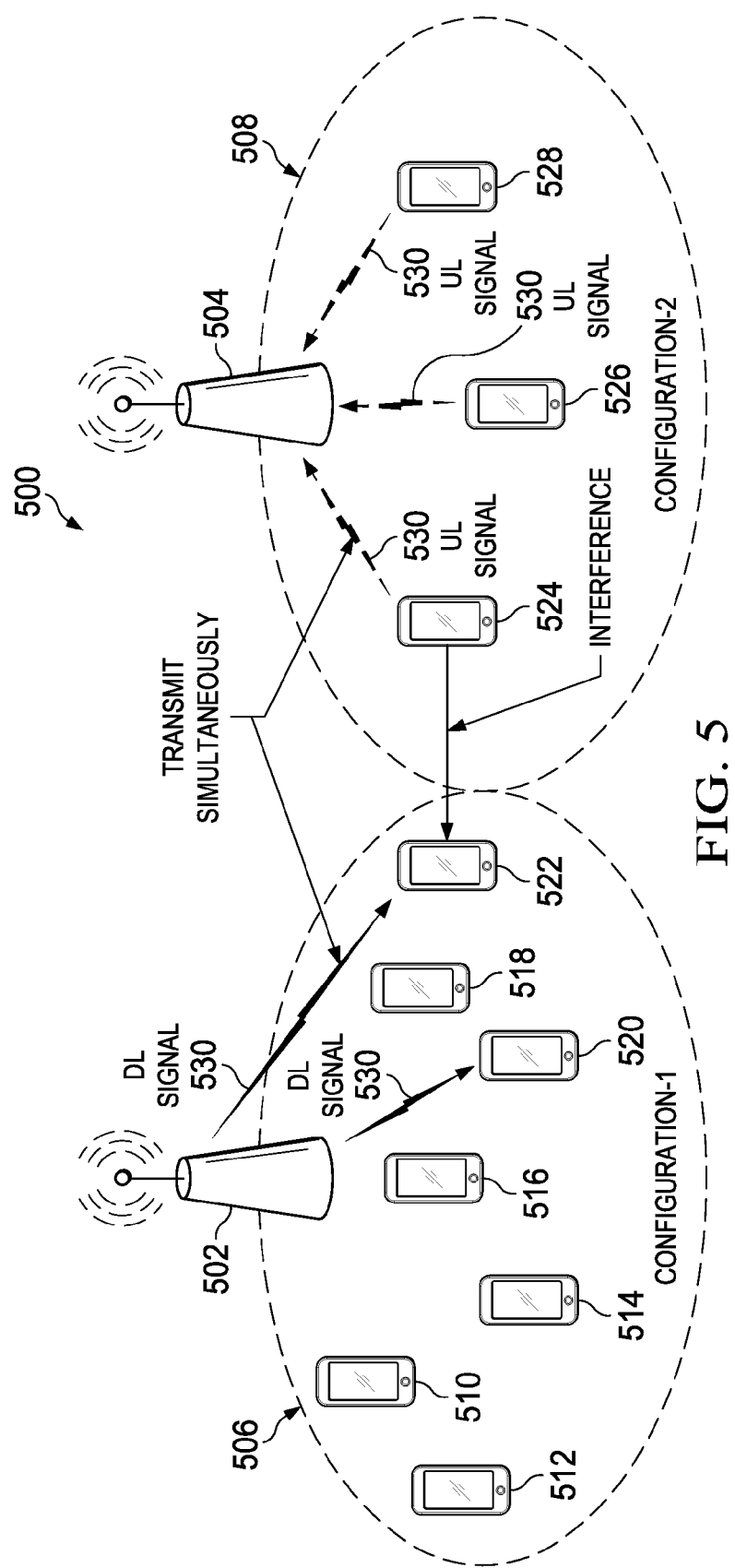
FIG. 5 is a diagram of an embodiment communication system for interference management while performing UL sounding in the DL frequency carrier.

FIG. 5 depicts an embodiment communication system 500 for interference management while performing UL sounding in the DL frequency carrier. System 500 includes multiple TPs 502, 504, each with a corresponding coverage area 506, 508. The system 500 also includes a plurality of UEs 510, 512, 514, 516, 518, 520, 522, 524, 526, and 528. UEs 510, 512, 514, 516, 518, 520, 522 communicate with TP 502 and UEs 524, 526, 528 communicate with TP 504. When there is an overlap of DL transmission period and the UL sounding window between adjacent transmitters, interference may occur when the UE receiving DL signals and the UE sending sounding signals are close to each other. For example, as shown, when UE 524 transmits UL sounding signals in the DL frequency carrier to TP 504 at the same time that the TP 502 transmits DL signals in the DL frequency carrier to UEs 520, 522, UE 522 may experience interference caused by the transmission of UE 524. For interference management, each TP 502, 504 can DL beamform (BF) in order to enhance the DL signal strength. In an embodiment, one or more of the UEs 510, 512, 514, 516, 518, 520, 522, 524, 526, 528 may utilize multiple receiver antennas in order to reject the interference. In another embodiment, in order to manage the interference, the TPs 502, 504 coordinate their scheduling to avoid scheduling DL transmission to a UE 522 that is close to a UE 524 that is transmitting a sounding signal. In another embodiment, in order to manage the interference, the TPs 502, 504 coordinately schedule the UL sounding transmission of the UE 524 which is close to the UE 522 that is receiving a DL signal over the same channel resources.

Figure 6:
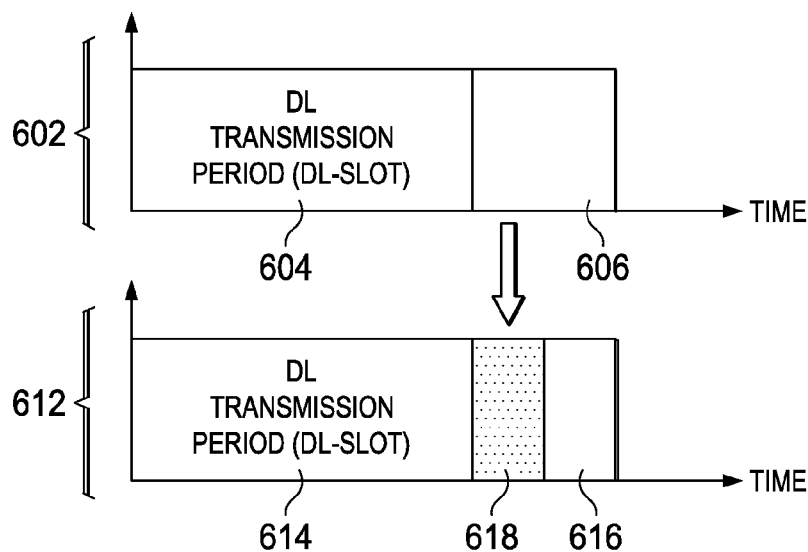
FIG. 6 is a graph showing UL sounding window schedules for neighboring APs for interference management.

FIG. 6 is a graph showing UL sounding window schedules 602, 604 for neighboring TPs for interference management. Schedule 602 corresponds to a schedule for a TP (e.g., TP 504 in FIG. 5) without taking neighboring DL transmission schedules into account. Schedule 602 includes a DL transmission period 604 and an UL sounding period 606. Schedule 612 is a schedule for the TP (e.g., TP 504 in FIG. 5) after taking into account neighboring DL transmission from a neighbor TP (e.g., TP 502 in FIG. 5). Schedule 612 includes a DL transmission period 614 and an UL sounding period 616 and a delay period 618 during which the UEs (e.g., UE 524) will not transmit UL sounding signals so as to not cause interference in a neighboring UE (e.g., UE 522) receiving DL signals from its TP (e.g., TP 502). The delay period 618 may correspond to a time when the neighboring UE (e.g., UE 522) receives DL signals from its TP (e.g., TP 502). In an embodiment, other UEs (e.g., UE 526 and UE 528) in the TPs coverage area (e.g., coverage area 508) that are not near the neighbor UE (e.g., UE 522) may transmit UL sounding signals during the delay period 618 since they are not close enough to the neighbor UE to cause interference. In an embodiment, the UE 522 and the UE 524 are scheduled in different frequency bands to avoid causing interference for each other.

Figure 7:
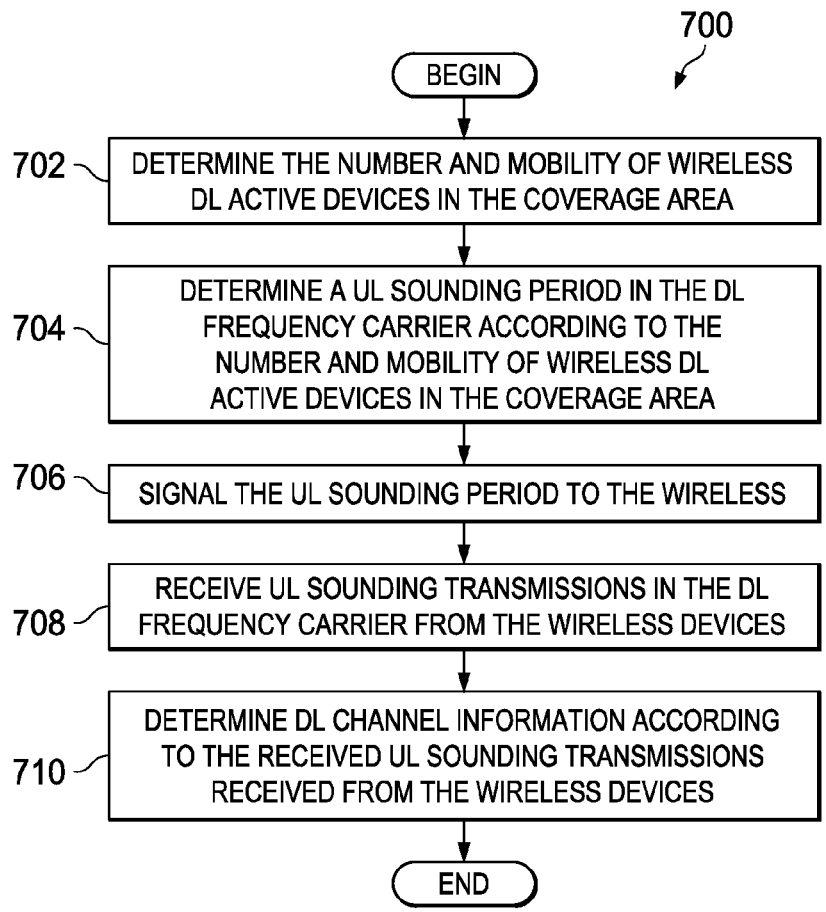
FIG. 7 is a flowchart of an embodiment method for determining channel state information about a DL channel.

FIG. 7 is a flowchart of an embodiment method 700 for determining channel state information about a DL channel. The method 700 begins at block 702 where a TP determines the number and mobility of wireless DL active devices in its coverage area. At block 704, the TP determines a schedule that includes a UL sounding period in the DL frequency carrier according to the number and mobility of wireless DL active devices in the coverage area, the amount of DL data to transmit, as well as other factors. At block 706, the TP signals the schedule, including the UL sounding period, to the wireless devices by broadcasting, multicasting, or unicasting. At block 708, the TP receives the UL sounding signals (or transmissions) in the DL frequency carrier from the wireless devices. At block 710, the TP determines DL channel state information according to the received UL sounding signals received from the wireless devices, after which, the method 700 ends.

Figure 8:
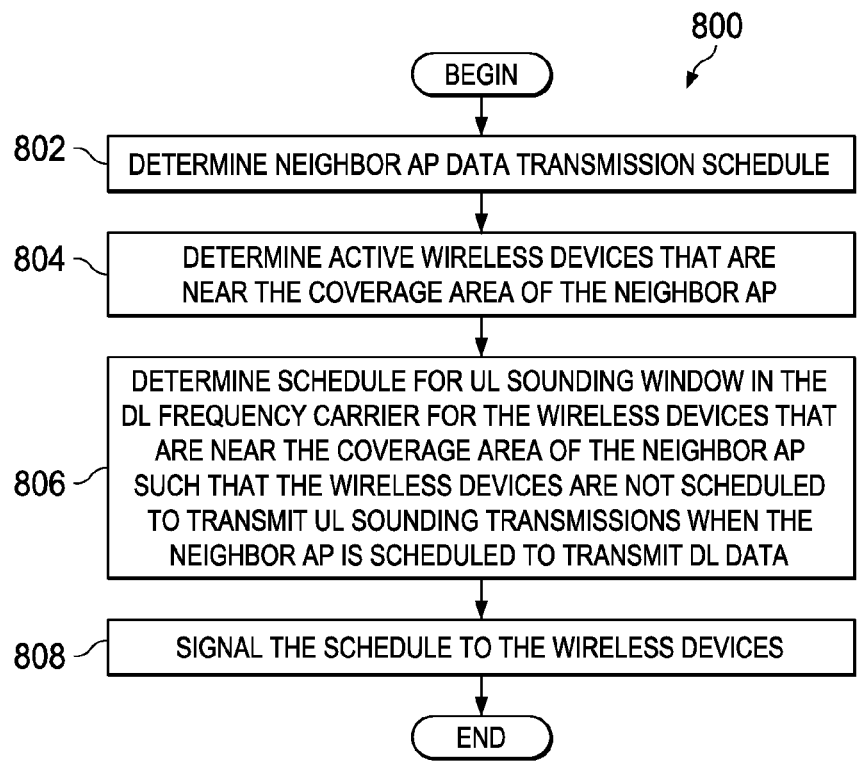
FIG. 8 is a flowchart of an embodiment method for managing interference from neighbor UEs transmitting UL sounding signals in a DL frequency carrier.

FIG. 8 is a flowchart of an embodiment method 800 for managing interference from neighbor UEs transmitting UL sounding signals in a DL frequency carrier. The method 800 begins at block 802 where the TP determines or obtains information about a neighbor TP's data transmission schedule. The neighbor TPs may communicate with each other to jointly schedule the UL sounding periods. At block 804, the TP determines active wireless devices in its coverage area that are near the coverage are of the neighbor TP. At block 806, the TP determines the schedule for the UL sounding window (in the time domain or in the frequency domain) in the DL frequency carrier for the wireless devices that are near the coverage area of the neighbor TP such that the wireless devices are not scheduled to transmit UL sounding transmissions when the neighbor TP is scheduled to transmit DL data to nearby wireless devices. At block 808, the TP signals (e.g., broadcasts or multicasts) the schedule to the wireless devices in its coverage area, after which, the method 800 ends.

Figure 9:
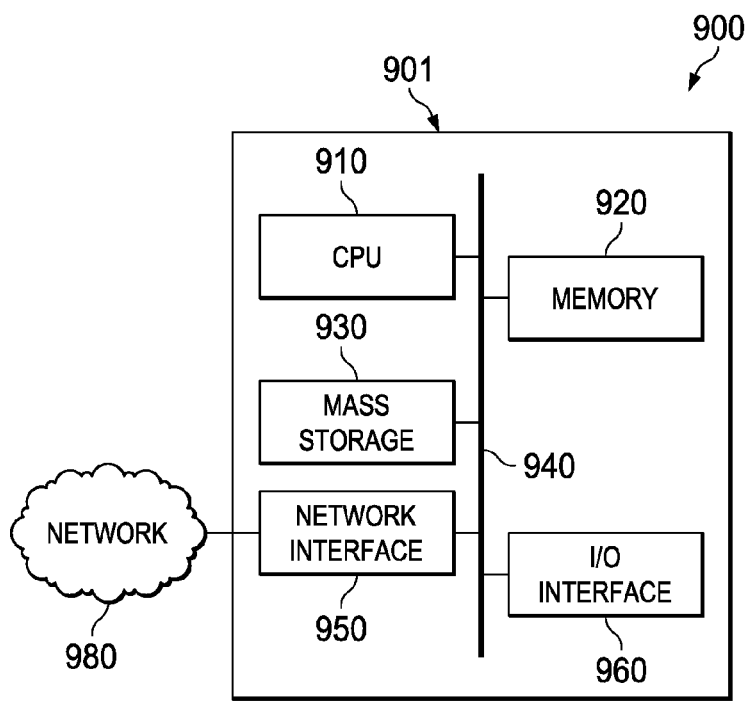
FIG. 9 is a processing system that can be used to implement various embodiments.

FIG. 9 is a block diagram of a processing system 900 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, memory 920, a mass storage device 930, a network interface 950, and an I/O interface 960 connected to a bus 940.

The bus 940 may be one or more of any type of several bus architectures including a memory bus or memory controller, a peripheral bus, video bus, or the like. The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs.

The mass storage device 930 may comprise any type of storage device configured to store data, programs, and other information and to make the data, programs, and other information accessible via the bus 940. The mass storage device 930 may comprise, for example, one or more of a solid state drive, hard disk drive, a magnetic disk drive, an optical disk drive, or the like.

The I/O interface 960 may provide interfaces to couple external input and output devices to the processing unit 901. The I/O interface 960 may include a video adapter. Examples of input and output devices may include a display coupled to the video adapter and a mouse/keyboard/printer coupled to the I/O interface. Other devices may be coupled to the processing unit 901 and additional or fewer interface cards may be utilized. For example, a serial interface such as Universal Serial Bus (USB) (not shown) may be used to provide an interface for a printer.

The processing unit 901 may also include one or more network interfaces 950, which may comprise wired links, such as an Ethernet cable or the like, and/or wireless links to access nodes or different networks. The network interface 901 allows the processing unit to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a controller for downlink channel sounding in a frequency division duplex wireless system, the method comprising:
   determining with a controller a schedule for a first transmission point (TP) for an uplink sounding window in a downlink frequency band, the schedule determined according to a transmission mode of at least one of a plurality of wireless devices in a coverage area of the first TP, wherein the uplink sounding window comprises a transmission window in at least a partial downlink frequency band that is reserved for uplink channel sounding;
   instructing the first TP to signal the schedule to at least one first wireless device in the coverage area of the first TP;
   instructing a second TP to utilize beamforming when transmitting a signal to a second wireless device to reduce the effect of interference on the second wireless device caused by a channel sounding signal transmitted by the at least one first wireless device;
   receiving the channel sounding signal in the downlink frequency band from the at least one first wireless device; and
   obtaining downlink channel state information for the first TP from the channel sounding signal.

2. The method of claim 1, wherein the determining with the controller the schedule includes determining the schedule in accordance with a number of active wireless devices in the coverage area.

3. The method of claim 1, wherein the determining with the controller the schedule includes determining the schedule in accordance with a mobility of the at least one first wireless device.

4. The method of claim 1, wherein the determining with the controller the schedule includes determining the schedule in accordance with a traffic type of at least one of the wireless devices.

5. The method of claim 1, wherein the determining with the controller the schedule includes determining the schedule includes dynamically determining the schedule.

6. The method of claim 1, wherein the determining with the controller the schedule includes determining the schedule includes semi-statically determining the schedule.

7. The method of claim 1, further comprising sending uplink sounding window configuration information to a neighbor TP, wherein the uplink sounding window configuration information comprises a time duration for the uplink sounding window.

8. The method of claim 7, wherein sending the uplink sounding window configuration information to the neighbor TP comprises sending the uplink sounding window configuration information via a backhaul network.

9. The method of claim 1, further comprising sending uplink sounding window configuration information to a neighbor TP, wherein the uplink sounding window configuration information comprises information of which UEs to be scheduled.

10. The method of claim 1, further comprising receiving neighbor uplink sounding window configuration information from a plurality of neighbor TPs, wherein the neighbor uplink sounding window configuration information comprises a time duration for the uplink sounding window and the UEs to be scheduled by a corresponding neighbor TP.

11. The method of claim 10, further comprising sending the neighbor uplink sounding window configuration information to the neighbor TPs.

12. The method of claim 1, wherein determining with the controller the schedule comprises scheduling the uplink sounding window at a different time or frequency from a time or frequency when a neighbor TP is scheduled to transmit a downlink signal to a neighbor wireless device in an edge of a coverage area of the neighbor TP.

13. The method of claim 1, wherein at least one of the wireless devices comprises multiple receiver antennas to reject interference caused by a neighbor wireless device performing channel sounding on the downlink frequency band when the at least one of the wireless devices is receiving a downlink signal from the first TP.

14. The method of claim 1, wherein the controller comprises the first TP.

15. A network component configured for downlink channel sounding in a frequency division duplex wireless system comprising:
a processor; and
a non-transitory computer readable storage medium storing programming for execution by the processor, the programming including instructions to:
determine a schedule for a first transmission point (TP) for an uplink sounding window in a downlink frequency band, the schedule determined according to a transmission mode of at least one of a plurality of wireless devices in a coverage area of the first TP, wherein the uplink sounding window comprises a time window in at least a partial downlink (DL) frequency band that is reserved for uplink channel sounding;
instruct the first TP to signal the schedule to at least one first wireless device in the coverage area of the first TP;
instruct a second TP to utilize beamforming when transmitting a DL signal to a second wireless device to reduce the effect of interference on the second wireless device caused by a channel sounding signal transmitted by the at least one first wireless device;
receive the channel sounding signal in the downlink frequency band from the at least one first wireless device; and
obtain downlink channel state information for the first TP from the channel sounding signal.

16. The network component of claim 15, wherein the instructions to determine the schedule include instructions to determine the schedule in accordance with a number of active wireless devices in the coverage area.

17. The network component of claim 15, wherein the instructions to determine the schedule include instructions to determine the schedule in accordance with a mobility of the at least one first wireless device.

18. The network component of claim 15, wherein the instructions to determine the schedule include instructions to determine the schedule in accordance with a traffic type of at least one of the wireless devices.

19. The network component of claim 15, wherein the instructions to determine the schedule include instructions to dynamically determine the schedule.

20. The network component of claim 15, wherein the programming further comprises instructions to send uplink sounding window configuration information to a neighbor TP, wherein the uplink sounding window configuration information comprises a time duration for the uplink sounding window.

21. The network component of claim 20, wherein the instructions to send the uplink sounding window configuration information to the neighbor TP comprises instructions to send the uplink sounding window configuration information via a backhaul network.

22. The network component of claim 15, wherein the programming further comprises instructions to send uplink sounding window configuration information to a neighbor TP, wherein the uplink sounding window configuration information comprises information of which UEs to be scheduled.

23. The network component of claim 15, wherein the programming further comprises instructions to receive neighbor uplink sounding window configuration information from a plurality of neighbor TP, wherein the neighbor uplink sounding window configuration information comprises a time duration for the uplink sounding window and the UEs to be scheduled by a corresponding neighbor TP.

24. The network component of claim 23, wherein the programming further comprises instructions to send the neighbor uplink sounding window configuration information to the neighbor TPs.

25. The network component of claim 15, wherein the instructions to determine the schedule comprise instructions to schedule the uplink sounding window at a different time or frequency from a time or frequency when a neighbor TP is scheduled to transmit a downlink signal to a neighbor wireless device in an edge of a coverage area of the neighbor TP.

26. The network component of claim 15, wherein at least one of the wireless devices comprises multiple receiver antennas to reject interference caused by a neighbor wireless device channel sounding on the downlink frequency band when the at least one of the wireless devices is receiving a downlink signal from the first TP.

27. The network component of claim 15, wherein the network component comprises the first TP.

28. A method in a network component for determining downlink channel state information in a frequency division duplex wireless system, the method comprising:

determining with the network component a schedule for transmissions, the schedule determined according to a transmission mode of at least one of a plurality of wireless devices in a coverage area of the first TP, wherein the schedule comprises a downlink (DL) transmission period for DL data transmission in a DL frequency carrier to wireless devices in a coverage area and an uplink (UL) sounding period for UL channel sounding in the DL frequency carrier;

signaling the schedule to the wireless devices;

transmitting DL data to at least one of the wireless devices during the DL transmission period;

beamforming a DL signal to one of the wireless devices during the UL sounding period to mitigate interference from UL sounding signals;

receiving UL sounding signals in the DL frequency carrier from at least one of the wireless devices during the UL sounding period; and determining DL channel state information according to the UL sounding signals.

29. The method of claim 28, further comprises determining a schedule for DL transmission from a neighbor transmission point (TP) and determining the UL sounding period such that the UL sounding period is scheduled for a different time or frequency than the DL transmission from the neighbor TP.

30. The method of claim 28, wherein determining the UL sounding period comprises determining a number of active wireless devices in the coverage area.

31. The method of claim 28, wherein a duration of the UL sounding period is different than a duration of a subsequent UL sounding period.

* * * * *